United States Patent
Choi

(10) Patent No.: US 10,667,371 B2
(45) Date of Patent: May 26, 2020

(54) TENT WITH WIRELESSLY CONTROLLED ILLUMINATION

(71) Applicant: Campvalley (Xiamen) Co., Ltd., Xiamen (CN)

(72) Inventor: Kwan Jun Choi, Xiamen (CN)

(73) Assignee: Campvalley (Xiamen) Co., LTD., Xiamen (CN)

( * ) Notice: Subject to any disclaimer, the term of this patent is extended or adjusted under 35 U.S.C. 154(b) by 77 days.

(21) Appl. No.: 15/920,308

(22) Filed: Mar. 13, 2018

(65) Prior Publication Data
US 2018/0270935 A1 Sep. 20, 2018

(30) Foreign Application Priority Data
Mar. 15, 2017 (CN) .................... 2017 2 0251984 U

(51) Int. Cl.
| | |
|---|---|
| H05B 47/19 | (2020.01) |
| F21S 9/03 | (2006.01) |
| H02J 3/38 | (2006.01) |
| H02J 7/35 | (2006.01) |
| H02S 99/00 | (2014.01) |
| E04H 15/48 | (2006.01) |

(Continued)

(52) U.S. Cl.
CPC ............ *H05B 47/19* (2020.01); *E04H 15/10* (2013.01); *E04H 15/48* (2013.01); *F21S 9/03* (2013.01); *H02J 3/383* (2013.01); *H02J 7/35* (2013.01); *H02S 40/38* (2014.12); *H02S 99/00* (2013.01); *H05B 45/10* (2020.01); *F21Y 2115/10* (2016.08); *H05B 47/16* (2020.01); *Y02B 20/346* (2013.01); *Y02B 20/42* (2013.01)

(58) Field of Classification Search
CPC ............ H05B 37/0272; H05B 33/0845; H05B 37/0281; H02S 40/38; H02S 99/00; F04H 15/10; F04H 15/48; F21S 9/03; H02J 3/383; H02J 7/35; F21Y 2115/10; F21Y 115/10

See application file for complete search history.

(56) References Cited

U.S. PATENT DOCUMENTS

| | | |
|---|---|---|
| 4,817,044 A | 3/1989 | Ogren |
| 6,089,727 A | 7/2000 | Wu |

(Continued)

FOREIGN PATENT DOCUMENTS

| | | |
|---|---|---|
| CN | 200949757 Y | 9/2007 |
| CN | 201924648 U | 8/2011 |

(Continued)

*Primary Examiner* — Robert L Deberadinis
(74) *Attorney, Agent, or Firm* — Morgan, Lewis & Bockius LLP

(57) ABSTRACT

A tent includes a tent frame, an illumination source, and a control system. The illumination source and control system are disposed at the tent frame. The control system includes receiving, processing, driving module, voltage output, and timing modules. The receiving module receives wirelessly a signal from an electronic device and sends the signal to the processing module to process the signal. Depending on the type of the signal, the processing module sends a command to the driving, voltage output, or timing module. In response to the command, the driving, voltage output, or timing module turns on/off the illumination source, adjusts its brightness, or turns on/off the illumination source at a specific time point and for a specific time period.

16 Claims, 3 Drawing Sheets

(51) Int. Cl.
  *E04H 15/10* (2006.01)
  *H02S 40/38* (2014.01)
  *H05B 45/10* (2020.01)
  *F21Y 115/10* (2016.01)
  *H05B 47/16* (2020.01)

(56) References Cited

U.S. PATENT DOCUMENTS

| | | | |
|---|---|---|---|
| 6,439,249 | B1 | 8/2002 | Pan |
| 6,773,140 | B2 | 8/2004 | Lee |
| 7,455,427 | B1 | 11/2008 | Freeman |
| 7,562,667 | B2 | 7/2009 | Li |
| 2003/0084931 | A1 | 5/2003 | Lee |
| 2008/0000513 | A1 | 1/2008 | Lee |
| 2008/0029141 | A1 | 2/2008 | Grand |
| 2008/0072945 | A1 | 3/2008 | Grand Pre |
| 2013/0271966 | A1* | 10/2013 | Doble ............ A45B 3/04 362/183 |
| 2015/0034137 | A1 | 2/2015 | Tanaeim |
| 2017/0292285 | A1 | 10/2017 | Jin |

FOREIGN PATENT DOCUMENTS

| | | |
|---|---|---|
| CN | 203684790 U | 7/2014 |
| CN | 204492319 U | 7/2015 |
| CN | 204627108 U | 9/2015 |
| CN | 204691386 U | 10/2015 |
| CN | 205025192 U | 2/2016 |
| CN | 205591637 U | 9/2016 |
| CN | 205743243 U | 11/2016 |
| CN | 205840492 U | 12/2016 |
| CN | 206035078 U | 3/2017 |
| CN | 206035080 U | 3/2017 |
| WO | WO 2012/088973 A1 | 7/2012 |
| WO | WO 2015/183926 A1 | 12/2015 |

* cited by examiner

TENT WITH WIRELESSLY CONTROLLED ILLUMINATION

CROSS-REFERENCE TO RELATED APPLICATIONS

The present application claims priority of Chinese Utility Model Applications CN 201720251984.X filed Mar. 15, 2017, the entire content of which application is incorporated herein for all purposes by this reference.

FIELD OF THE INVENTION

The present invention generally relates to tents, and more particularly, relates to tent with wirelessly controlled illumination.

BACKGROUND

Most existing tents do not have illumination means. If illumination is desired, in particular at night, one often needs to set up a lighting device (e.g., a lamp) and connect the lighting device to a power source or power facility outside of the tent. It is inconvenient, time-consuming and cumbersome. Moreover, in many cases, the lighting device can only be turned on or off with no means to adjust its brightness, resulting in ineffective and inefficient use of electrical energy. Further, in some cases, for instance when a power source or power facility outside of the tent is not available, the tent cannot provide desired illumination at all.

Given the current state of the art, there remains a need for tents that address the abovementioned issues.

The information disclosed in this Background section is provided for an understanding of the general background of the invention and is not an acknowledgement or suggestion that this information forms part of the prior art already known to a person skilled in the art.

SUMMARY

The present invention is directed to tents with wirelessly controlled illumination that can be turned on/off, adjusted or timed.

In various exemplary embodiments, the present invention provides a tent including a tent frame including a plurality of poles connected with each other. The tent also includes an illumination source and a control system disposed at the tent frame. The control system is configured to control operation of the illumination source, and include a receiving module, a processing module, a driving module, a voltage output module, and a timing module. The receiving module is in wireless communication with an electronic device and in electrical communication with the processing module, and is configured to receive wirelessly a signal from the electronic device and to send the signal to the processing module. The processing module is in electrical communication with the driving module, the voltage output module, and the timing module, and configured to process the signal and send a command to the driving, voltage output, or timing module if the signal includes an on/off, brightness adjustment, or timing request, respectively. The driving module is in electrical communication with the illumination source and configured to turn on/off the illumination source in response to the command from the processing module. The voltage output module is in electrical communication with the illumination source and configured to output a voltage or a voltage waveform specified by the signal in response to the command from the processing module, thereby adjusting a brightness of the illumination source. The timing module is in electrical communication with the illumination source and configured to turn on/off the illumination source at a specific time point and for a specific time period in response to the command from the processing module.

In many exemplary embodiments, the control system further includes a power module in electrical communication with the receiving module, the processing module or both to provide electrical power to the receiving module, the processing module or both. In an exemplary embodiment, the power module includes a plurality of lithium batteries electrically connected in series.

In some exemplary embodiments, the tent further an external power source electrically connected with the receiving module, the processing module or both to provide electrical power to the receiving module, the processing module or both. In an exemplary embodiment, the external power source includes a solar panel to generate electricity from sunlight, and a storage battery in electrical communication with the solar panel to store the electricity generated by the solar panel. The storage battery is also in electrical communication with the receiving module, the processing module or both to provide electrical power to the receiving module, the processing module or both.

In many exemplary embodiments, the plurality of poles is pivotally connected with each other with a top when the tent is unfolded, and the control system is disposed at the top when the tent is unfolded.

In some exemplary embodiments, the illumination source includes a plurality of individual light emitting diodes (LEDs) electrically connected with each other in series or in parallel.

In some exemplary embodiments, the illumination source includes one or more LED strings, each including a plurality of individual LEDs electrically connected with each other in series and each disposed at a corresponding pole in the plurality of poles along a length direction of the corresponding pole. In an exemplary embodiment, of a respective LED string in the one or more LED strings, the plurality of individual LEDs is evenly spaced.

In some exemplary embodiments, the illumination source includes an LED strip disposed at an upper portion of the tent when the tent is unfolded. In some exemplary embodiments, the LED strip surrounds a top of the tent when the tent is unfolded. In an exemplary embodiment, the LED strip forms a substantially circular or oval shape.

In some exemplary embodiments, the illumination source includes two or more LED strips or strings electrically connected with each other in parallel.

In some exemplary embodiments, the tent of the present invention further the electronic device. In an exemplary embodiment, the electronic device is a smartphone, a computer, a tablet, or a remote.

Exemplary tents of the present invention have other features and advantages that will be apparent from or are set forth in more detail in the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more embodiments of the present application and, together with the detailed description, serve to explain the principles and implementations of the application.

DETAILED DESCRIPTION

Figure 1:
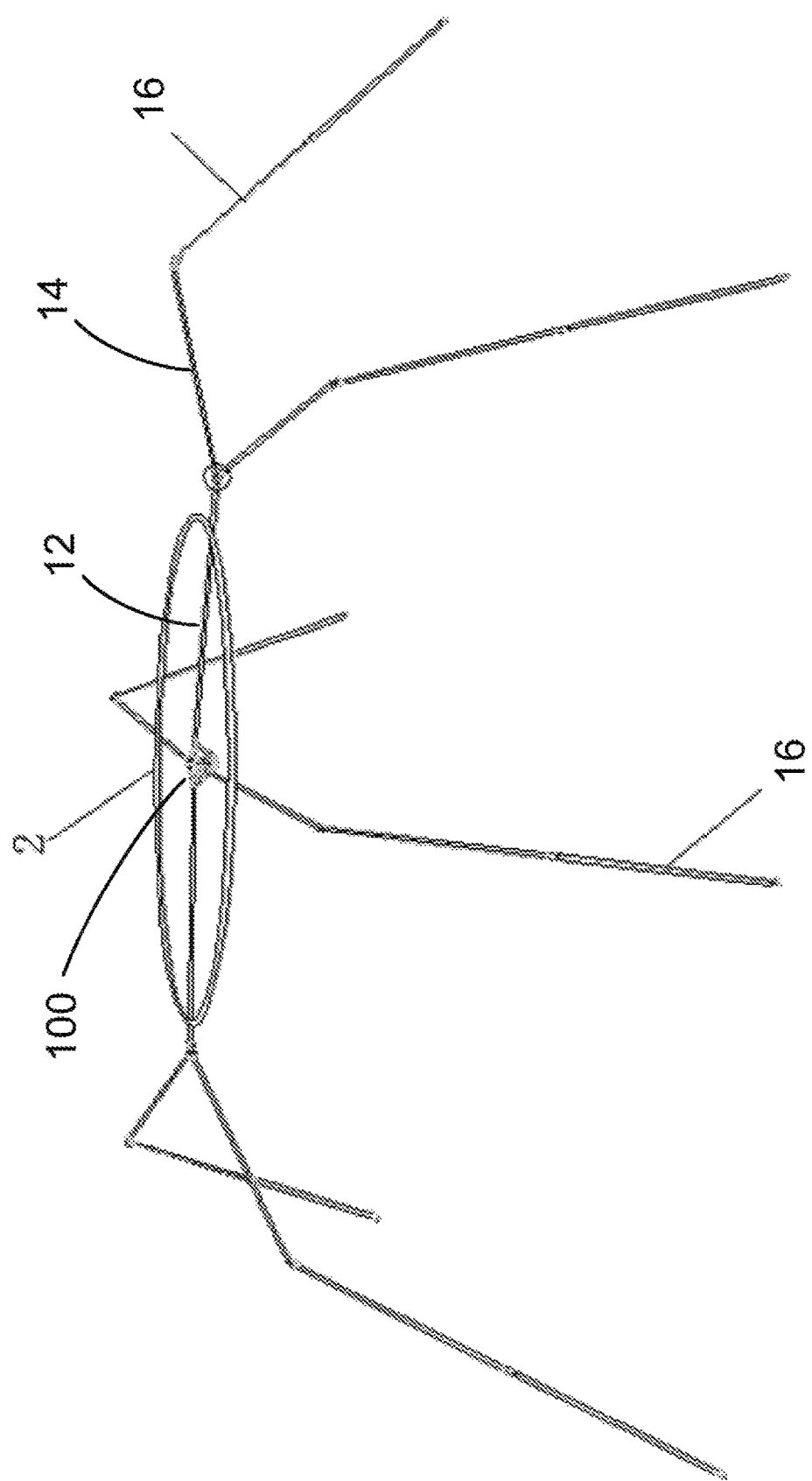
FIG. 1 is a schematic view illustrating a first exemplary tent in an unfolded state in accordance with the present invention.

Reference will now be made in detail to implementations of the exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the embodiments set forth in this disclosure can be made without departing from their spirit and scope, as will be apparent to those skilled in the art. The specific embodiments described herein are offered by way of example only, and the disclosure is to be limited only by the terms of the appended claims, along with the full scope of equivalents to which such claims are entitled.

Embodiments of the present invention are described in the context of tents with illumination. A tent of the present invention generally includes a tent frame, an illumination source and a control system. The tent frame when unfolded can be can be of various sizes and shapes including but not limited to gazebos, domes, shelters and other types. The illumination source is disposed at or integrally formed with the tent frame. The control system is disposed at the tent frame and electrically connected with the illumination source. In many cases, the control system receives wirelessly a signal from an electronic device and controls operation of the illumination source in accord with the received signal. In some cases, the tent of the present invention also includes the electronic device.

A tent frame of the present invention generally includes a plurality of poles interconnected directly or indirectly with each other in various different ways. The plurality of poles can be upper, middle, lower, vertical, oblique, side, or other types of poles. Some examples of such tent frames are disclosed in WO 2017/187264, WO 2017/125066, PCT/IB16/01478, U.S. Ser. No. 15/516,875, AU 2018200336, US 2017/0292285, the entire contents of which are incorporated herein for all purposes by this reference.

Figure 2:
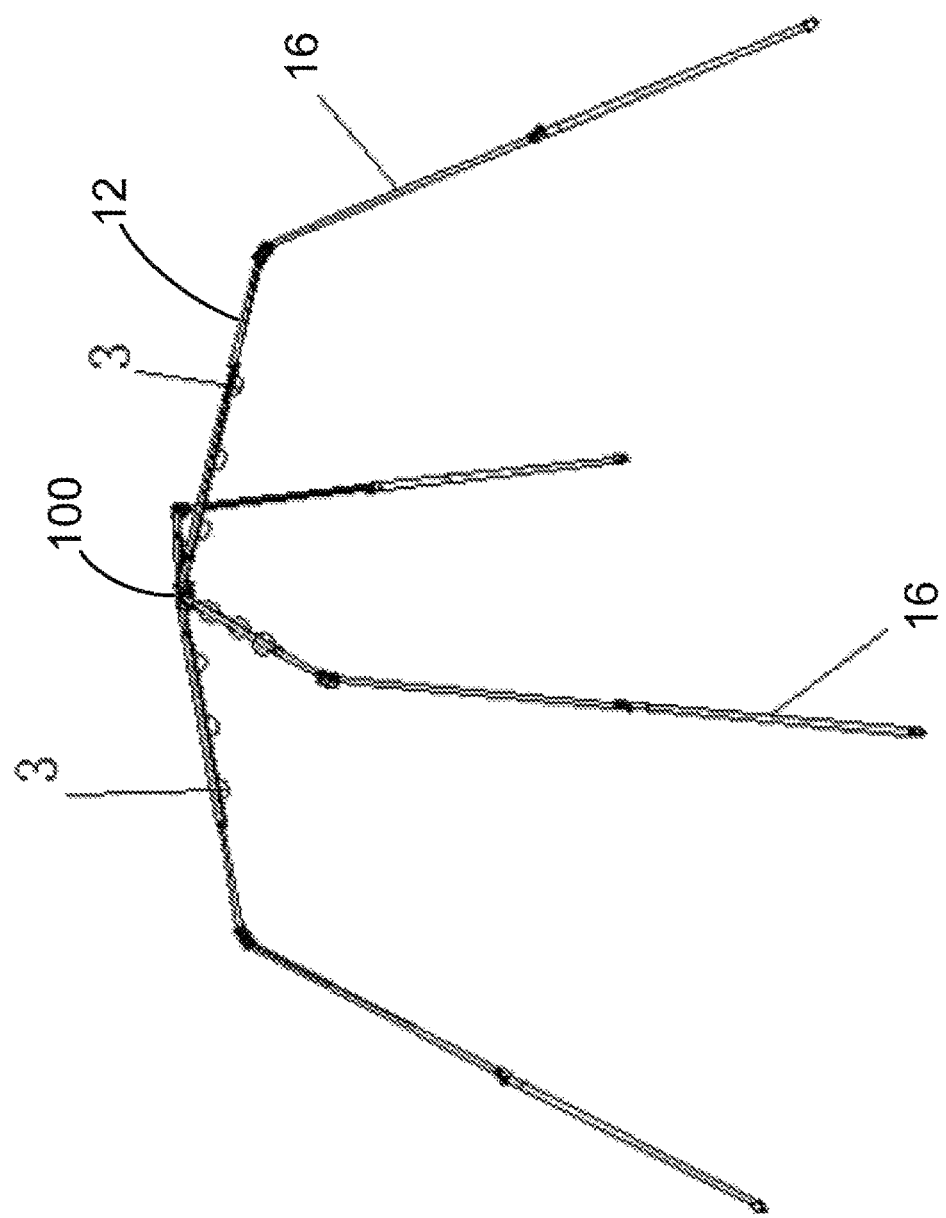
FIG. 2 is a schematic view illustrating a second exemplary tent in an unfolded state in accordance with the present invention.

As one example, FIG. 2 illustrates a tent frame composed of a plurality of upper poles 12 and a plurality of lower poles 16. Each upper pole has one end pivotally connected with other upper poles and the other end pivotally connected with a lower pole. As another example, FIG. 1 illustrates a tent frame with middle poles 14, in addition to upper poles 12 and lower poles 16. Each middle pole is disposed between an upper pole and a lower pole and pivotally connecting the upper pole with the lower pole.

In various exemplary embodiments, a tent of the present invention includes an illumination source disposed at or integrally formed with the tent frame. The illumination source can be any suitable lighting sources including but not limited to light-emitting diodes (LEDs). The illumination source can also be of any suitable forms including but not limited to flexible strips and individual lights. The illumination source can further be disposed at any pole or any number of poles. In some cases, the illumination source is integrated with the tent frame (e.g., incorporated with a pole to form an illumination pole). Some examples of such illumination poles are disclosed in WO 2017/187264, WO 2017/125066, PCT/IB16/01478, U.S. Ser. No. 15/516,875, AU 2018200336, US 2017/0292285, the entire contents of which are incorporated herein for all purposes by this reference.

By way of example, FIG. 1 illustrates elongated illumination source 2 disposed at an upper portion of the tent frame when the tent is unfolded, for instance, being fastened on the upper poles by clips, fasteners, adhesives, or other suitable means. In some cases, clips are configured to have grooves with contours similar to the poles of the tent frame to facilitate coupling of the illumination source with the poles. In some cases, the elongated illumination source is disposed at the tent frame with its two ends touching each other, forming a closed loop that surrounds the top of the tent when the tent is unfolded. The closed loop can be of any suitable regular or irregular shapes including but not limited to circular, oval, polygonal shapes. In other cases, the elongated illumination source is disposed at the tent frame with its two ends touching each other not touching each other when the tent is unfolded.

The elongated illumination source can emit a light of a single color or a light of multiple colors. In some embodiments, the elongated illumination source includes an LED strip. In an embodiment, the elongated illumination source includes two or more LED strips electrically connected with each other in parallel. As such, each LED strip can function independently, and can provide illumination even if other strip(s) are not operated or are malfunctioned.

In many exemplary embodiments, the illumination source includes a plurality of individual lights (e.g., individual light bulbs, individual LEDs) electrically connected with each other in series or in parallel. In some exemplary embodiments, the illumination source includes one or more strings (e.g., LED strings), each having a plurality of individual lights (e.g., individual LEDs) electrically connected with each other in series and each disposed at a corresponding pole in the plurality of poles along a length direction of the corresponding pole. For instance, FIG. 2 illustrates four LED strings, each disposed at one of the four upper poles and each having a plurality of individual LEDs 3 electrically connected with each other in series. The LED strings can be fastened (e.g., clipped or glued) on the upper poles. It should be noted that the number of LED strings and the number of upper poles can be but not necessarily have to be the same. It should also be noted that an LED string can be disposed at other poles such as the middle or lower poles. In some cases, two or more LED strings electrically connected with each other in parallel is disposed at one pole. As such, each LED string can function independently, and can provide illumination even if other string(s) are not operated or are malfunctioned.

In some exemplary embodiments, of a particular LED string, the plurality of individual LEDs is evenly spaced, i.e., with a constant distance between two adjacent LEDs. In an exemplary embodiment, the LED string is disposed along a portion of the upper pole. In another exemplary embodiment, the LED string is disposed along the entire length of the pole.

Operation of the illumination source is controlled by a control system of the present invention. In many exemplary embodiments, the control system is disposed at the tent frame, for instance, at one or more poles or coupled with the tent frame. Some examples of coupling a control system with a connector of a tent frame are disclosed in WO 2017/187264, WO 2017/125066, PCT/IB16/01478, U.S. Ser. No. 15/516,875, AU 2018200336, US 2017/0292285, the entire contents of which are incorporated herein for all purposes by this reference. By way of example, FIGS. 1 and 2 illustrate control system 100 disposed at a top of the tent frame.

Figure 3:
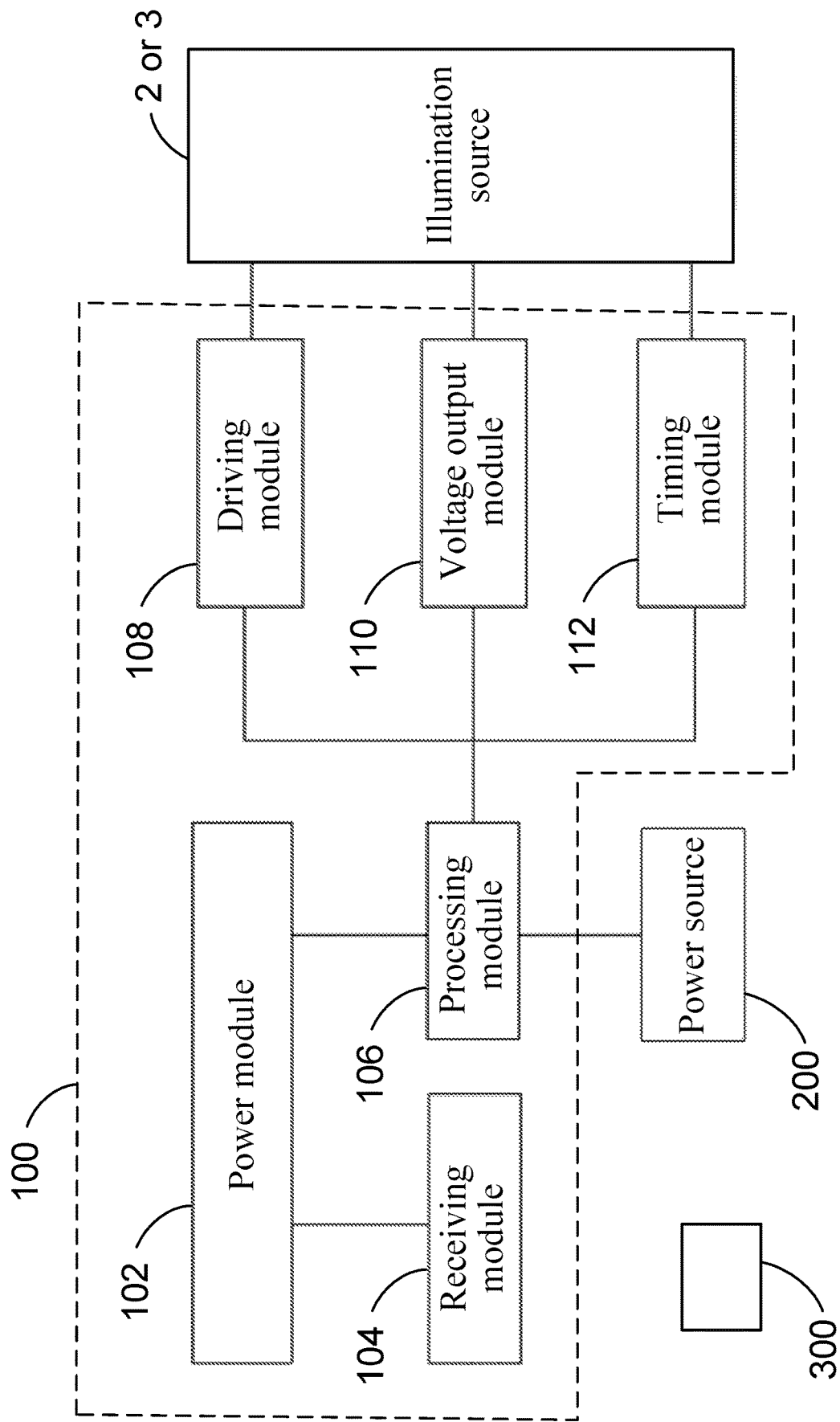
FIG. 3 is a block diagram illustrating an exemplary control system in accordance with the present invention.

Referring to FIG. 3, in many exemplary embodiments, control system 100 includes receiving module 104, processing module 106, driving module 108, voltage output module 110, and timing module 112. As used herein, the term "module" refers to a component or a circuitry that performs a specific function. In some cases, a module is a self-contained component or circuitry that can be packaged individually or in combination with other module(s). In other cases, a module is a circuitry or a portion of a circuitry in a printed circuit board (PCB).

Receiving module 104 is in wireless communication, for instance, through a wireless technology such as Bluetooth technology, with an electronic device such as electronic device 300. The electronic device is a smartphone, a computer, a tablet, a remote, or the like. Receiving module 104 is also in electrical communication with processing module 106, which in turn is in electrical communication with driving module 108, voltage output module 110, and timing module 112. The driving module, the voltage output module, and the timing module each is in electrical communication with the illumination source.

When illumination or change of the illumination is desired, one can use the electronic device or an application (e.g., an APP) of the electronic device to send a signal. Receiving module 104 receives wirelessly the signal from the electronic device, and sends the signal to the processing module. The signal can include a variety of identifiers including but not limited to an on/off request, a brightness adjustment request, a timing request, or other identifiers.

Processing module 106 processes the signal to determine the type of the signal and commands (e.g., sends a command to) a subsequent module in accord with the type of the signal. For instance, in some exemplary embodiments, the processing module processes the signal to determine whether it is an on/off request, a brightness adjustment request, or a timing request. If it is an on/off request, the processing module commands or sends a command to the driving module. If it is a brightness adjustment request, the processing module commands or sends a command to the voltage output module. If it is a timing request, the processing module commands or sends a command to the timing module.

In response to the command from the processing module, driving module 108 turns on/off the illumination source. In some cases, the driving module functions like a switch, turning on the illumination source if it is already off, and turning off the illumination source if it is already on.

In response to the command from the processing module, voltage output module 110 outputs a voltage or a voltage waveform specified by the signal to the illumination source, and thus adjusts the brightness of the illumination source. In some cases, the voltage output module can adjust the brightness of the illumination source from nearly dark to fully lit. In some cases, the voltage output module functions like a light dimmer.

In response to the command from the processing module, timing module 112 turns on/off the illumination source at a specific time point and for a specific time period. For instance, if the illumination source is off at the present time point, the timing module turns on the illumination source at an on-time point specified by the signal, and let it stay lit for a time period, and then turns off the illumination source at an off-time point specified by the signal. Similarly, if the illumination source is on at the present time point, the timing module turns off the illumination source at an off-time point specified by the signal, and let it stay unlit for a time period, and then turns on the illumination source at an on-time point specified by the signal.

In some exemplary embodiments, control system 100 includes additional, optional or alternative component(s) such as power module 102. The power module is in electrical communication with the receiving module, the processing module or both to provide electrical power to the receiving module, the processing module or both. In an exemplary embodiment, the power module includes a plurality of batteries, such as lithium batteries, electrically connected in series.

The tent of the present invention can include additional, optional or alternative component(s). For instance, in some exemplary embodiments, the tent of the present invention further includes external power source 200 electrically connected with the receiving module, the processing module or both. External power source 200 can be used as an additional, optional or alternative to power module 102, providing electrical power to the receiving module, the processing module or both. In an exemplary embodiment, the external power source includes a solar panel to generate electricity from sunlight, and a storage battery in electrical communication with the solar panel to store the electricity generated by the solar panel. The solar panel can be disposed at a tent cloth or other suitable places. Some examples of solar panels are disclosed in WO 2017/187264, the entire content of which is incorporated herein for all purposes by this reference. The storage battery is in electrical communication with the receiving module, the processing module or both to provide electrical power to the receiving module, the processing module or both.

As disclosed herein, a tent of the present invention includes wireless technology (e.g., Bluetooth technology) to control operation (e.g., on/off, brightness adjustment, timing) of the illumination source. As such, the tent can effectively and efficiently provide illumination when desired. Moreover, in many cases, a tent of the present invention also includes a solar panel that generates electricity from sunlight, and a storage battery that stores the electricity generated by the solar panel. This enhances the usability of the tent, and also makes the tent environmentally friendly. Further, in many cases, a tent of the present invention includes LED string(s) with individual LEDs evenly and spatially distributed or LED strip(s) disposed at an upper portion of the tent. As such, the tent can provide uniform illumination to a larger space.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "upper" or "lower", and etc. are used to describe features of the exemplary embodiments with reference to the positions of such features as displayed in the figures.

What is claimed is:

1. A tent comprising:
a tent frame comprising a plurality of poles connected with each other;
an illumination source disposed at the tent frame; and
a control system disposed at the tent frame to control operation of the illumination source, the control system comprising a receiving module, a processing module, a driving module, a voltage output module, and a timing module, wherein
the receiving module is in wireless communication with an electronic device and in electrical communication with the processing module, and is configured to receive wirelessly a signal from the electronic device and to send the signal to the processing module;
the processing module is in electrical communication with the driving module, the voltage output module, and the timing module, and configured to process the signal and send a command to the driving, voltage output, or timing module if the signal includes an on/off, brightness adjustment, or timing request, respectively;
the driving module is in electrical communication with the illumination source and configured to turn on/off the illumination source in response to the command from the processing module;
the voltage output module is in electrical communication with the illumination source and configured to output a voltage or a voltage waveform specified by the signal in response to the command from the processing module, thereby adjusting a brightness of the illumination source; and
the timing module is in electrical communication with the illumination source and configured to turn on/off the illumination source at a specific time point and for a specific time period in response to the command from the processing module.

2. The tent of claim 1, wherein the control system further comprises a power module in electrical communication with the receiving module, the processing module or both to provide electrical power to the receiving module, the processing module or both.

3. The tent of claim 2, wherein the power module comprises a plurality of lithium batteries electrically connected in series.

4. The tent of claim 1, further comprising an external power source electrically connected with the receiving module, the processing module or both to provide electrical power to the receiving module, the processing module or both.

5. The tent of claim 4, wherein the external power source comprises:
a solar panel to generate electricity from sunlight; and
a storage battery in electrical communication with the solar panel to store the electricity generated by the solar panel and in electrical communication with the receiving module, the processing module or both to provide electrical power to the receiving module, the processing module or both.

6. The tent of claim 1, wherein the plurality of poles comprises a plurality of upper poles that is pivotally connected with each other at ends thereof to form a top of the tent when the tent is unfolded, and the control system is disposed at the top of the tent when the tent is unfolded, wherein the illumination source comprises two or more LED strings, each disposed at a corresponding upper pole in the plurality of upper poles along a length direction of the corresponding upper pole.

7. The tent of claim 6, wherein each of the or more LED strings comprises a plurality of individual LEDs electrically connected with each other in series.

8. The tent of claim 1, wherein the illumination source comprises a plurality of individual light emitting diodes (LEDs) electrically connected with each other in series or in parallel.

9. The tent of claim 1, wherein the illumination source comprises one or more LED strings, each comprising a plurality of individual LEDs electrically connected with each other in series and each disposed at a corresponding pole in the plurality of poles along a length direction of the corresponding pole.

10. The tent of claim 9, wherein of a respective LED string in the one or more LED strings, the plurality of individual LEDs is evenly spaced.

11. The tent of claim 1, wherein the plurality of poles comprises a plurality of upper poles that is pivotally connected with each other at ends thereof to form a top of the tent when the tent is unfolded, and the illumination source comprises an LED strip disposed at the plurality of upper poles and surrounding the top of the tent when the tent is unfolded.

12. The tent of claim 11, wherein the LED strip forms a substantially circular or oval shape.

13. The tent of claim 11, wherein the control system is disposed at the top when the tent is unfolded.

14. The tent of claim 1, wherein the illumination source comprises two or more LED strips or strings electrically connected with each other in parallel.

15. The tent of claim 1, further comprising the electronic device.

16. The tent of claim 1, wherein the electronic device is a smartphone, a computer, a tablet, or a remote.

* * * * *